May 30, 1933.  G. W. ALLEN  1,912,115
LEAD-IN DEVICE
Filed July 17, 1931

Witness
Ernest A. Myers

Inventor
George W. Allen
by his attorneys
Van Everen, Fish, Hildreth & Cary

Patented May 30, 1933

1,912,115

UNITED STATES PATENT OFFICE

GEORGE W. ALLEN, OF HYDE PARK, MASSACHUSETTS, ASSIGNOR TO B. F. STURTEVANT COMPANY, OF HYDE PARK, MASSACHUSETTS, A CORPORATION OF MASSACHUSETTS

LEAD-IN DEVICE

Application filed July 17, 1931. Serial No. 551,445.

The present invention relates to lead-in devices and particularly to devices for leading a cord into an electrical appliance such as the handle of a vacuum cleaner.

A common form of lead-in device comprises a coil spring surrounding the cord, for the purpose of flexibly supporting the cord and preventing sharp bends therein immediately adjacent to the appliance. The spring, however, is not ordinarily adapted for resisting mechanical stresses on the cord, and it is customary to knot the cord inside the appliance. The construction is expensive, and it is open to the disadvantage that it may cause undue wear on the insulation of the cord, with ultimately a short-circuit or break.

The object of the present invention is to provide a simple and inexpensive lead-in member, which is sufficiently flexible to allow bending movements of the cord, which protects the cord against sharp bends and also against wear, and which secures the cord against pulling out and relieves any possibility of strain on the internal connection.

With these objects in view, the present invention comprises the lead-in device hereinafter described and particularly defined in the claims.

Figure 1:
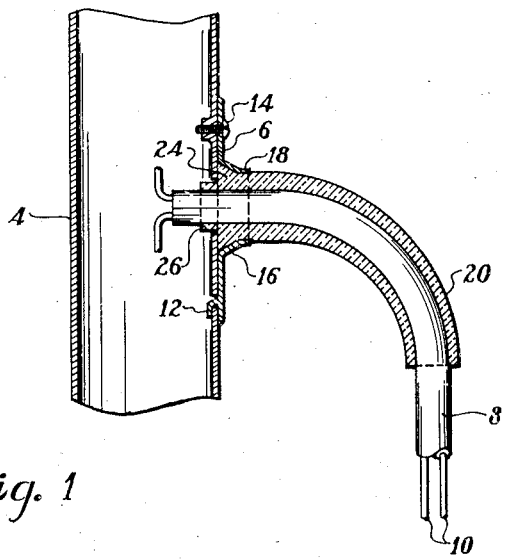
Figure 2:
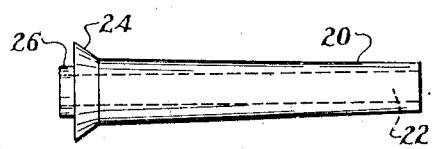

In the accompanying drawing, Fig. 1 is a section elevation of the preferred form of the invention applied to the handle of a vacuum cleaner, and Fig. 2 is a detail view of the device on the tube.

In the illustrated embodiment of the invention, the vacuum cleaner handle 4 is fitted with a cord plate 6, through which passes a cord 8, illustrated as a smooth rubber covered cord enclosing the wires 10. The cord plate at one end has an integral finger 12 passing through a small hole in the handle and engaging the inner wall of the handle. The plate at the other end is secured to the handle by a screw 14.

Surrounding the cord opening of the plate is a flange having an outwardly tapering portion 16 and a short cylindrical portion 18 beyond the taper. Passing through the opening is a slightly tapered, flexible rubber tube 20 having a longitudinal passage 22 to receive the cord 8. Near the end, the tube is formed with an integral compressible enlarged portion 24, of slightly steeper taper than the tapered portion 16 of the cord plate. The length of the enlargement 24 of the tube is approximately equal to the length of the cord plate flange, that is, to the combined length of the tapered and cylindrical portions 16 and 18. The external diameter of the tube for a portion of its length adjacent the enlargement 24 is slightly greater than the internal diameter of the cylindrical portion 18. Beyond the enlargement 24, the tube has a short bushing 26 to extend through an opening in the handle 4, and to protect the cord against wear by the handle.

In assembling the device, the cord is first passed through the passage 22 of the tube. With a rubber tube and a rubber covered cord, this is best accomplished by turning or twisting the cord while threading it through the tube, the tube passage being preferably of sufficiently small diameter to afford some binding between the tube and cord. The cord and the tube are then passed through the plate from the inside thereof, the slight taper of the tube permitting the free passage of the smaller end and the major portion of the tube, but before the tapered, enlarged end 24 reaches the flange 16, the tube has filled the hole in the plate and considerable force is required to compress the rubber in drawing the tube into final position, as shown in Fig. 1. Thus, the resulting compression of the inner end of the long taper not only secures the tube in the flange, but also binds the tube onto the cord. This binding is enhanced by the fact that the enlargement 24 is made to conform to the shape of the portions 16 and 18 of the flange. After the tube is seated in the plate, any longitudinal stress on the cord draws the tube more firmly into the flange and increases the binding or jamming of the tube on the cord.

The cord plate is then attached to the handle, the end face of the taper 24 then lying closely against the handle 4, as shown in Fig. 1. The wires in the handle will be connected in any suitable manner to the motor or to a control switch, as usual in this type of apparatus. The cord extending from the outer end of the rubber tube will be provided with the usual connection for attachment to some suitable source of electric power.

As shown in Fig. 1, the invention permits free bending of the cord in all directions, but prevents sharp bends adjacent to the plate which would result in rapid wear of the insulation and ultimate breakage of the conductors within. The cord is completely enclosed and protected against injury at the points where injury most frequently occurs in the usual appliances. The cord is firmly locked against pulling stresses, in fact, the locking becomes firmer as the stress is increased, thereby permitting any desired electrical connections to be made internally of the appliance, with the assurance that no mechanical stresses can be placed thereon. Moreover, the parts are retained against inward movement by the engagement of the handle 4 with the end of the enlargement 24.

Notwithstanding the secure locking of the cord in the tube in service, the parts can be easily disassembled whenever necessary for repairs to the appliance. After removal of the cord plate, a simple pull on the cord on the inside of the plate frees the tube from the plate and permits removal of tube and cord, after which the cord can be withdrawn from the tube if required.

Although the invention has been described as applied to vacuum cleaners, for which it is particularly suitable because of the severe conditions that they must meet in service, it is, however, applicable to any electrical devices, such as lamps, heaters, washers, and the like, and may, if desired, be used for holding a flexible cord or other article securely in position in an opening.

Having thus described the invention, what is claimed is:

1. The combination with a cord, of a tube surrounding the cord, and having a compressible enlarged end portion, and means for jamming the end portion to bind the tube on the cord upon longitudinal strain on the tube.

2. The combination with a cord, of a compressible, tapered tube surrounding the cord, and a member having an opening of a size to compress the tube to grip the cord when the tube is longitudinally forced into the opening.

3. The combination with a cord, of a tapered, compressible tube surrounding the cord, and a cord plate through which the cord passes and having a flange to compress the tube to cause it to grip the cord when the tube is longitudinally forced through the plate.

4. The combination with a cord, of a tube surrounding the cord, and a cord plate through which the tube passes and having means for jamming the end portion of the tube to bind it on the cord upon longitudinal strain on the tube.

5. An electrical lead-in comprising a plate having an opening and a flange surrounding the opening, a flexible tube extending outwardly from the plate and having an enlarged compressible end portion received in the flange and adapted to be compressed thereby when longitudinally forced therein to grip a cord received in the tube.

6. An electrical lead-in comprising a plate having an opening and an outwardly tapering flange surrounding the opening, a flexible tube to receive a cord extending outwardly from the plate and having an enlarged tapered compressible end portion fitting snugly within the flange upon longitudinal stress placed on the tube to be held thereby and to grip the cord.

7. The combination with a rubber covered cord of a rubber tube closely encircling the cord, and a plate having an opening through which the tube passes, and an outwardly tapering flange surrounding the opening, the tube having an integral compressible end portion snugly engaging in the tapered flange to secure the tube with relation to the flange and to grip the cord within the tube when the tube is longitudinally forced through the opening.

8. The combination with a cord plate having an opening and a flange surrounding the opening with an outwardly tapered portion and a cylindrical portion, of a flexible tube having an end portion with a taper approximately equal in length to the length of the flange and slightly steeper than the tapered portion thereof and longitudinally forced into the flange, and a cord closely received in and gripped by the tube.

9. The combination with a hollow member having a cord opening and a cord plate having an opening and a flange, of a cord, a tapered compressible tube surrounding the cord and being at its inner end of greater diameter than the internal diameter of the flange, and longitudinally forced into the flange to grip the cord, and an enlargement on the inner end of the tube retained between the hollow member and the cord plate.

10. The combination with a hollow member having a cord opening and a cord plate having an opening and a flange, of a cord, a tapered compressible tube surrounding the cord and being at its inner end of greater diameter than the internal diameter of the flange and longitudinally forced into the flange to grip the cord, an enlargement on the inner end of the tube retained between the hollow member and the cord plate, and a bushing extending inwardly from the enlargement into the cord opening of the hollow member.

In testimony whereof I have signed my name to this specification.

GEORGE W. ALLEN.